May 7, 1957  E. W. JACOBSON ET AL  2,791,257
TRACTION LINK FOR MARSH BUGGY WHEELS
Filed March 22, 1954  2 Sheets-Sheet 2

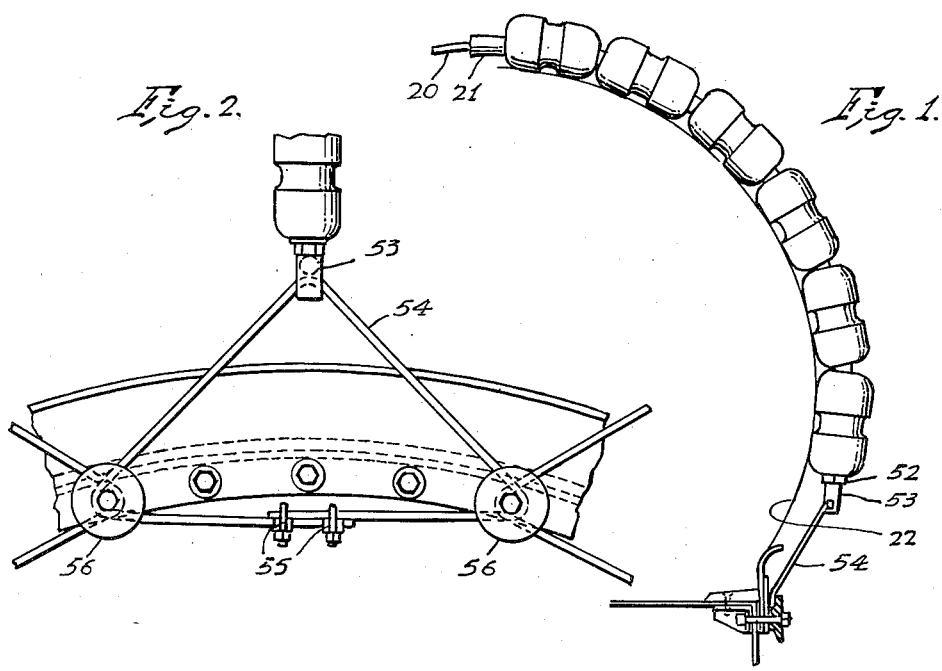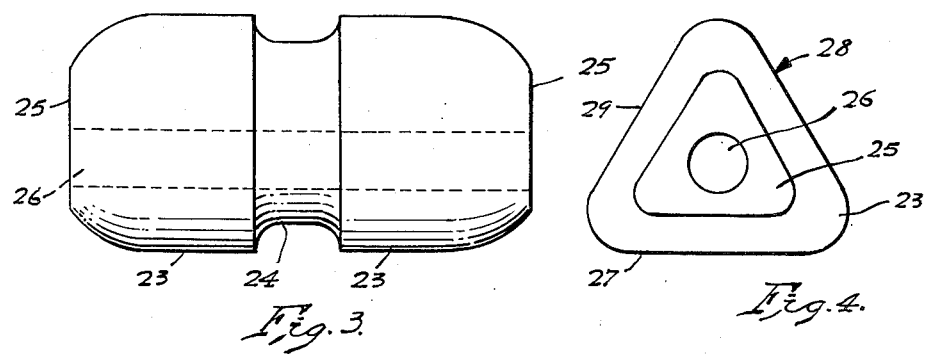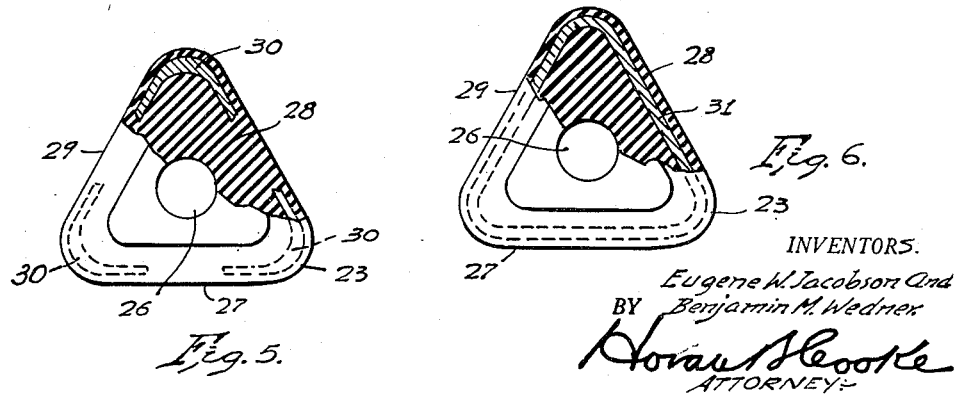

INVENTORS.
Eugene W. Jacobson and
Benjamin M. Wedner.
BY
Horace H. Cooke
ATTORNEY.

United States Patent Office 2,791,257
Patented May 7, 1957

2,791,257
TRACTION LINK FOR MARSH BUGGY WHEELS

Eugene W. Jacobson, Oakmont, and Benjamin M. Wedner, Pittsburgh, Pa., assignors to Gulf Research & Development Company, Pittsburgh, Pa., a corporation of Delaware Application March 22, 1954, Serial No. 417,888

3 Claims. (Cl. 152—244)

This invention relates to improvements in auxiliary traction devices for wheeled vehicles, such devices being particularly applicable to amphibious vehicles having large, smooth-surfaced, pneumatic tires on which the devices are mounted to function as paddles for propelling the vehicle in water, as well as serving to increase traction on soft, marshy terrain, on snow and ice and to assist in climbing from water to land.

The invention is especially useful as an adjunct to the type of amphibious vehicle known as the Marsh Buggy (Patent No. 2,187,658), which has found wide use in geo-physical exploration of such treacherous country as the Mississippi delta where there are many thousands of square miles of practically bottomless mud and floating vegetation crisscrossed by bayous and discontinuous bodies of open water. Although such territory cannot be traversed either by boat or on foot, it has not proved a hinderance to operation of the Marsh Buggy, for this vehicle provides a stable platform for crew and instruments and because of its large buoyant tires it is not only capable of climbing marshy banks when emerging from water, without undue backward tilting of the platform, but the platform is supported at a height sufficient to clear most vegetation or to press it down in passing.

The tires of such a vehicle are ten feet or more in diameter and are of light construction, without molded tread, to afford maximum buoyancy. Also, their wide area of ground contact provides adequate support for the vehicle on soft earth, but where mud (or in some territories snow or ice) is encountered some traction means must be provided and this must be such as will also serve to propel the vehicle in water.

The present invention, accordingly, has as one of its objects to provide auxiliary traction devices for the tires of power-driven vehicles, comprising segmental links of triangular, square or other angular cross-sectional shape which present substantially flat surfaces to the tire and which project outwardly as ridges or shoulders to bite into the earth, or alternatively to function as paddles, the devices being articulated and formed of short link segments strung end-to-end on a flexible cable which extends crosswise of the tire and which is secured at its end to the rim or wheel, the points at which the several links are secured to the wheel being equidistantly spaced for uniform distribution of strain on the wheel.

Another object of the invention is to provide a traction device comprising segmental links of angular cross-section strung on a cable and capable of being selectively rotated thereon to new positions as wear occurs, and in each such new position to present substantially flat surfaces to the tire and projecting ridges or shoulders for engagement with the ground.

A further object of the invention is to provide an articulated traction device for tires comprising segments strung end-to-end on a flexible cable, each segment comprising a body of compressible material formed with a suction depression in its ground-engaging face to increase its gripping action.

Other objects and advantages of the invention will be apparent from the following description and drawings, wherein:

Figure 1 is a transverse sectional view showing a portion of a tire with the traction device mounted thereon, the link segments in this view being the form shown in detail in Figures 3 and 4, and the cable fastening of the form shown in Figure 14.

Figure 2 is a detail elevation showing the fastening of the attaching cable end to the vhicle wheel.

Figure 3 is a side view of the preferred form of link segment which is of general dumbbell shape and triangular cross section.

Figure 4 is an end view of the link segment of Figure 3.

Figures 5 and 6 are transverse sectional views of modified forms of the link segment of Figure 3, such sections being taken through the head of the segment and showing metal inserts for gripping action on ice and for wear reinforcement.

Figure 7:
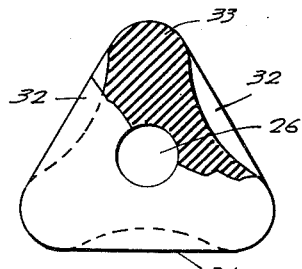
Figure 7 is a transverse sectional view of another form of link segment which is triangular in cross section and provided with suction depressions in its sides.

Referring more particularly to the drawings, a plurality of short link segments are shown in Figure 1, threaded in end-to-end relation on a stainless steel cable 20 which is covered by a protective sleeve 21, such as a length of hose or rubber tubing, to produce a flexible, articulated cross member for tire 22.

The preferred form of link segment shown in Figures 1 and 3 to 6 is of general dumbbell shape, having heads 23 connected by a waist portion 24. The heads 23 are triangular in cross section and have slightly rounded ends which terminate in flat end faces 25. Each segment is formed with a central bore 26 through which the cable is threaded, and each is adapted to rest with one of the flat surfaces 27, 28 or 29 of its triangular heads against the tire, at the same time exposing spaced angular ridges to the ground over which the vehicle is moving, the intervening gap between adjacent aligned ridges defining sharp shoulders which aid in retarding side slip of the wheel in difficult terrain. The broad base of each triangular shape, resting against the tire, prevents the link segment from accidental rotation and provides a flat surface which will not dig into and damage the tire, while the articulation of the assemblage allows contiguous segments to remain in firm contact with the curved surface of the tire and even to conform to irregularities.

As the cutting edge or ridge of any single segment wears, that segment may be rotated independently of the others to bring a different cutting edge into position, thereby extending its useful life. For cutting into crusted snow and into ice, as well as for reinforcement against wear, the segments may have embedded metal insert strips 30 or wire 31, as shown in Figures 5 and 6, respectively. The reinforcements add support so that the sharp edge of the link segment is maintained, and after wear the exposed metal preserves the shape of the edge and itself becomes the cutting edge. The segments may also be made of wood, or of rubber especially compounded to resist abrasion.

Compressible segments, such as those of molded rubber, may be formed with depressions functioning as suction cups which have particular utility in providing increased traction in snow or on icy surfaces and, by gripping the tire, to resist any tendency of the link to rotate on the cable, or to be pulled from contact with the tire by centrifugal force. As shown in Figure 7, suction depressions 32 are formed in the faces of the link segment at each side of the ridge or cutting edge 33, and the similar depression 34 in the base causes the segment to adhere more firmly to the tire so that there is less tendency for its accidental rotation on the cable. Thus, when the ground-engaging ridge becomes worn, the cable may be loosened and the link rotated to a new position in which it will be held by contact of another suction depression with the tire surface, although some shifting along the smooth surface of the tire is permitted within limits as the connecting cable may move with flexing of the tire.

Figure 8:
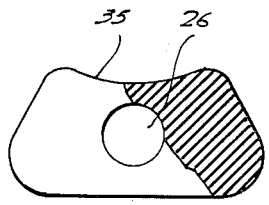
Figure 8 is a transverse sectional view of another form of link segment formed with a suction depression in its ground-engaging surface.
Figure 9:
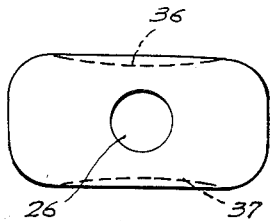
Figure 9 is an end view of a rectangular segment formed with opposite concave surfaces.
Figure 10:
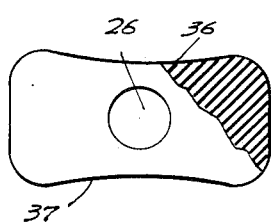
Figure 10 is a transverse medial section of the segment shown in Figure 9.

It is within the purview of this invention to provide segments of generally trapezoidal or rectangular cross section with depressions 35 in the ground-engaging surfaces as in Figure 8 or in both the ground-engaging and tire-engaging surfaces as at 36 and 37 in Figures 9 and 10.

Figure 11:
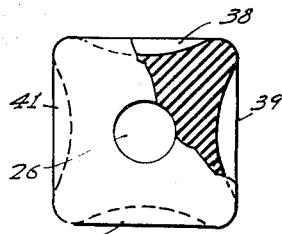
Figure 11 is a transverse medial section of a segment which is square in cross section and provided with suction depressions in its several faces.
Figure 12:
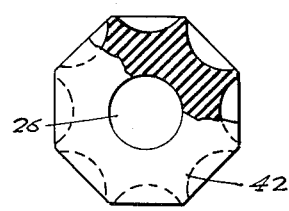
Figure 12 is a transverse medial section of an octagonal segment formed with suction depressions in its several faces.

In Figure 11 the segment is shown as having a square shape and being formed with concavities 38, 39, 40 and 41, which constitute suction depressions in all four surfaces, whereby any one of these may be presented to afford increased traction on snow or ice while the surface opposite to it grips the tire. Similarly, in Figure 12 the segment 42 has an octagonal shape, each face of which is formed with a concavity.

Figure 13:
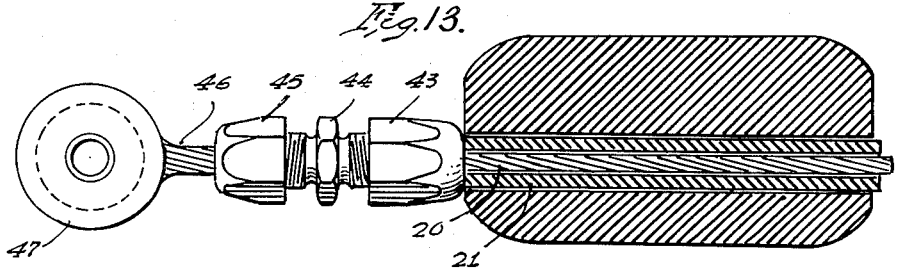
Figure 13 is a plan view, partly in section, of one form of cable end connection.
Figure 14:
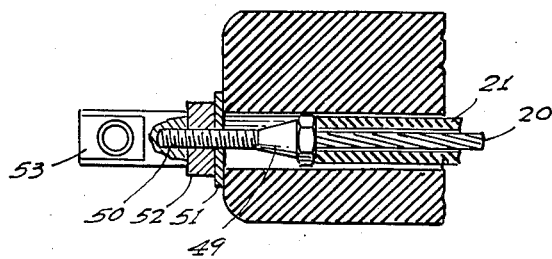
Figure 14 is a plan view, partly in section, of another form of cable end connection.

Various means by which the cable ends may be fastened to the wheel are shown in Figures 13 and 14. Referring first to the preferred form shown in Figure 13, the end of cable 20 is anchored in an internally threaded socket 43 which also constitutes an abutment limiting endwise movement of the tubular sleeve 21 on the cable. A nipple 44 which has oppositely threaded ends and a wrench engaging portion therebetween is screwed into the socket 43 at one end and at its opposite end is screwed into a second threaded socket 45, the pitch of the threads of the two sockets being reversed to each other so that in turning the nipple the sockets will be drawn together or separated, as desired. A short, looped section of cable joins the socket 45 to a grommet or eye 47 which receives an attaching cable running to the wheel.

In another form of fastening shown in Figure 14, the ends of the link-carrying cable are secured in the enlarged head 49 of an anchor bolt which has a long threaded shank 50 extending outwardly beyond the terminal link segment at each end. A washer 51 on the shank 50 abuts and holds the string of link segments and is retained by a nut 52. An end fitting 53 (Figures 1 and 14) is screwed onto the projecting end of the shank 50.

In either of the above-described forms of end fastening the terminal fitting has a hole or eye through which an attaching cable 54 is run, for securing the articulated assemblage crosswise of the tire with freedom to move along the tire. The attaching cable 54 constitutes a closed loop which is formed by securing its ends together by clamps 55 (Figure 2). This loop is spread to triangular shape by being passed around spaced buttons 56 which project from the vehicle wheel. Similar buttons are equidistantly spaced around the vehicle wheel, each one receiving the looped portions of adjacent links, whereby stress imposed by the several links upon the wheel or rim is distributed throughout its circumference. Because of the easy flexibility of the large and low pressure tire to which the device is applied, the triangular loop permits the link assemblage to shift along the tire without imposing undue strain on the attaching cable.

What we claim as our invention is:

1. A device for increasing vehicle wheel traction, comprising a flexible cable adapted to extend crosswise of a vehicle tire, and a plurality of compressible contiguous link segments rotatably mounted thereon, each said link segment being of multi-angular cross section and presenting at least one face to ground engagement, the several faces of each segment being formed with suction depressions.

2. An articulated traction device for power-driven vehicle wheels, comprising a flexible cable, contiguous link segments rotatably strung thereon in end-to-end relation, a flexible sleeve surrounding the cable and extending through longitudinal bores formed in the respective segments, a terminal fastening at each end of the cable providing an end abutment for said sleeve, said terminal fastening comprising a first threaded socket, a threaded nipple received therein, said nipple having an oppositely threaded portion received in a second threaded socket, a flexible connector secured in said second threaded socket and having a looped end, a flanged grommet retaining the looped end of said connector, and means for detachably securing said grommet to the vehicle wheel.

3. An auxiliary device for increasing vehicle wheel traction, comprising contiguous segments of angular cross-sectional shape having flat portions adapted to lie in contact with a tire to which the device is applied and outwardly projecting portions for ground engagement, said segments being formed with longitudinal bores and with suction depressions in their ground-engaging surfaces, a flexible cable extending through said bores in said segments, and means for fastening the ends of the cable to a vehicle wheel.

References Cited in the file of this patent

UNITED STATES PATENTS

| | | |
|---|---|---|
| 972,322 | Bekefi | Oct. 11, 1910 |
| 1,273,046 | Dyer | July 16, 1918 |
| 1,533,679 | Webster | Apr. 14, 1925 |
| 1,733,963 | Herbert | Oct. 29, 1929 |
| 2,728,371 | McCarthy | Dec. 27, 1955 |
| 2,740,449 | Erving | Apr. 3, 1956 |

FOREIGN PATENTS

| | | |
|---|---|---|
| 512,940 | France | Oct. 26, 1920 |